L. A. HAWKINS.
ELECTRIC MOTOR.
APPLICATION FILED NOV. 8, 1911.

1,027,048.

Patented May 21, 1912.
2 SHEETS—SHEET 1.

WITNESSES

INVENTOR
Laurence A Hawkins
BY
His ATTORNEY

L. A. HAWKINS.
ELECTRIC MOTOR.
APPLICATION FILED NOV. 8, 1911.

1,027,048.

Patented May 21, 1912.

2 SHEETS—SHEET 2.

UNITED STATES PATENT OFFICE.

LAURENCE A. HAWKINS, OF SCHENECTADY, NEW YORK, ASSIGNOR, BY MESNE ASSIGNMENTS, TO UNION SWITCH AND SIGNAL COMPANY, A CORPORATION OF PENNSYLVANIA.

ELECTRIC MOTOR.

1,027,048.  Specification of Letters Patent.  Patented May 21, 1912.

Application filed November 8, 1911. Serial No. 659,127.

*To all whom it may concern:*

Be it known that I, LAURENCE A. HAWKINS, a citizen of the United States, residing at Schenectady, in the county of Schenectady and State of New York, have invented certain new and useful Improvements in Electric Motors, of which the following is a specification.

My invention relates to electric motors, and has for an object the provision of a braking device for arresting the movement of the motor and of the parts connected therewith when the motor operating current is cut off.

I will describe a braking device embodying my invention, showing its application to a railway signal motor, and will then point out the novel features thereof in claims.

Figure 1:
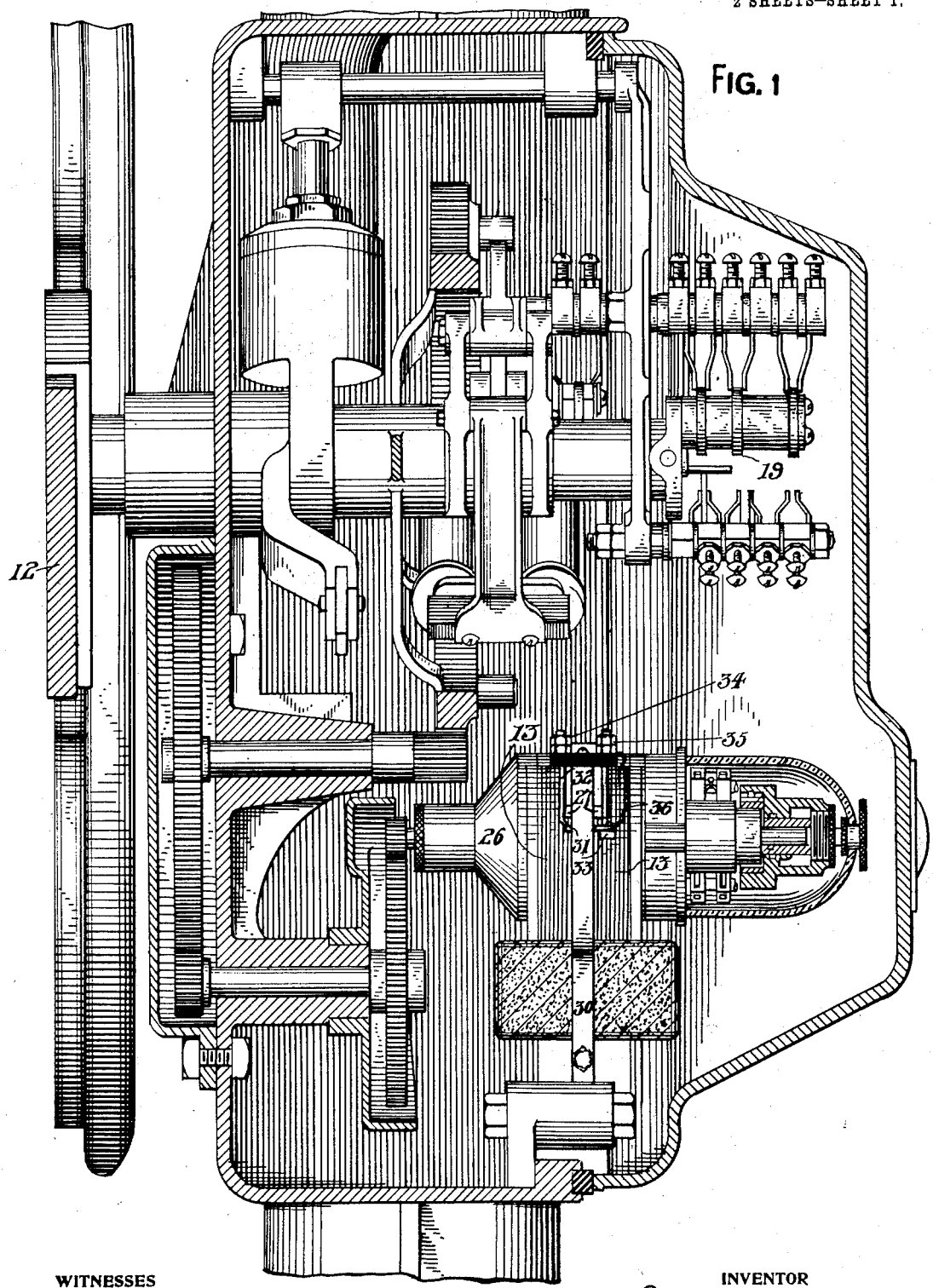
Figure 2:
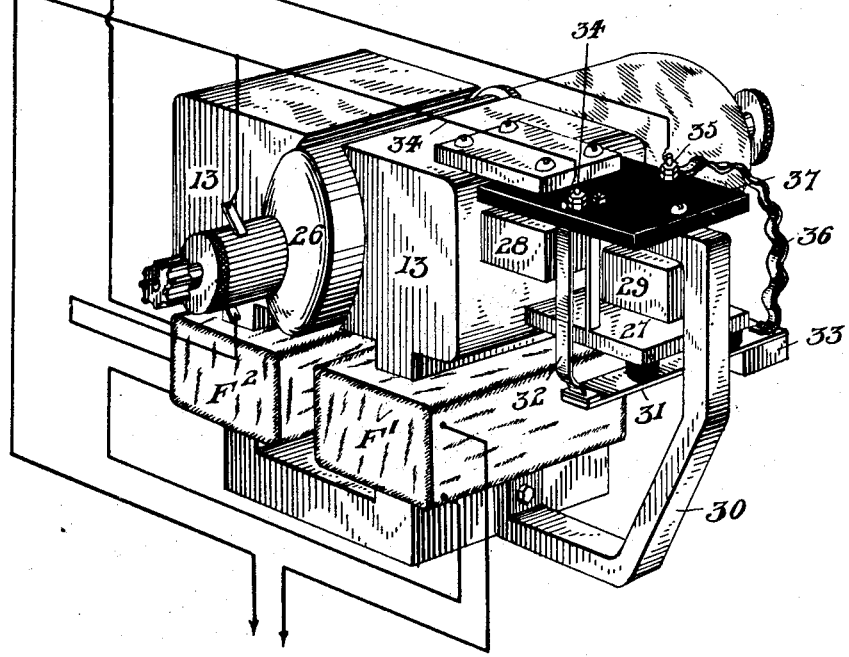
Figure 3:
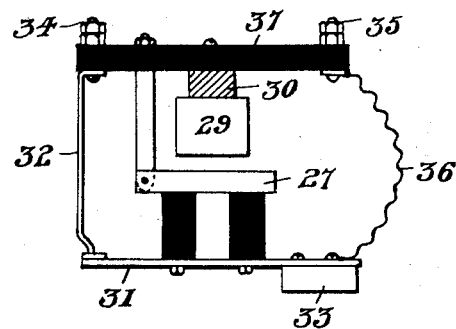

In the accompanying drawings, Figure 1 is a side elevation, with the inclosing casing in cross-section, showing one form of railway signal embodying my invention. Fig. 2 is a perspective view of the electric motor shown in Fig. 1, and having applied thereto one form of electric braking device embodying my invention. Fig. 3 is a view showing in side elevation the electric braking device shown in Figs. 1 and 2.

Similar reference characters refer to similar parts throughout the several views.

One feature of a braking device embodying my invention is the provision of an auxiliary circuit for the motor which when closed causes the motor to act as a generator, and a contact controlled by the magnetic flux in the motor field for opening and closing the auxiliary circuit according to whether or not the motor is energized by operating current. By this means the motor is converted into a generator immediately upon its operating current being cut off, and the movement of the motor and of the parts driven by the motor is therefore quickly arrested.

Referring to Fig. 1, I have here shown a railway signal of a type such as is shown and described in United States Letters Patent No. 868,648 granted to F. B. Corey on October 22, 1907. This signal comprises as usual a semaphore 12, an electric motor 13 for moving the semaphore, and suitable operating and controlling mechanism intermediate the motor and the semaphore.

Referring now to Figs. 2 and 3, in which I have shown a perspective view and an end elevation respectively of a portion of the motor 13, 26 designates the motor armature, 13 the motor field, and $F^1$ and $F^2$ the field coils. 27 is an auxiliary armature which is operated by magnetic flux produced by current in field coil $F^1$. This armature 27 is located in the field of two pole pieces 28 and 29, the former of which is secured to the motor field 13 directly above the coil $F^1$ and the latter of which is connected with the motor field piece below the coil $F^1$ by a strap 30 of paramagnetic material. It will be seen that the armature 27 will be raised or lowered according to whether or not current is flowing in field coil $F^1$. The armature 27 is pivoted as shown in Fig. 3, and carries an insulated contact finger 31, which, when the armature is lowered, makes contact with a stationary contact 32. High contact pressure may be obtained by placing the contact point of 31 and 32 near the pivotal point of the armature and providing the armature with a sufficient counterweight 33. The stationary contact 32 is connected with a terminal post 34, and the contact finger 31 is connected through a flexible connector 36 with a terminal post 35, which terminal posts are mounted in a suitable base 37 of insulated material. As will now be clearly seen, while no current is flowing in the motor field coil $F'$, armature 27 is lowered and terminal posts 34 and 35 are in electrical connection. But when current flows in field coil $F^1$, armature 27 is attracted and raised, and the contact between the terminal posts is broken. Field coil $F^1$ and a portion (here shown as the lower portion) of field coil $F^2$ are connected in series with the armature 26 in the usual manner. The upper portion of field coil $F^2$ is connected in short circuit across the terminals of armature 26 when the contacts 31 and 32 are closed, and this short circuit through the portion of field coil $F^2$ causes the motor to act as a generator and to thereby arrest the movement of the parts of the signal device when the motor operating current is cut off.

The operation of the electric braking device embodying my invention is as follows:—When the motor is deënergized, the short circuit braking contacts 31 and 32 are closed. When the motor operating circuit is closed (by a track relay or in other suitable manner) the magnetic flux produced by current in field coil $F^1$ operates armature 27 to open its contacts to allow the motor to drive the semaphore to caution position. When caution position is reached, the contacts on the semaphore shaft open the motor-operating circuit in the usual manner; this allows armature 27 to drop and short circuit the motor for braking. When the third position motor circuit is closed, the braking connections are again opened by the motor flux to allow the motor to drive the semaphore to clear position; and when clear position is reached the motor operating circuit is again opened in the usual manner, thereby again closing the chort-circuit contact for braking. For a two-position signal the operation would be exactly the same except that either the caution or clear position would be omitted.

It is important that the electric braking apparatus should be located on the opposite side of the motor from field coil $F^2$ part of which is used for the electric braking. There are two reasons for this:— First, since all of coil $F^1$ and only a portion of coil $F^2$ are in series with the motor armature during normal operation of the motor, a greater magneto-motive force is obtained for raising the braking armature 27 when this armature is operated by the stray magnetic flux from current in field coil $F^1$ than would be obtained if this armature were operated by the flux produced by current in field coil $F^2$; second, when the motor is operating as a generator for braking purposes, the braking current which flows in a portion of field coil $F^2$ produces no effect on the braking armature 27, so that there is no tendency to produce chattering of the armature or increase of the contact resistance between contacts 31 and 32, as would be the case if the braking armature were operated by flux due to current in field coil $F^2$.

Although I have shown an electric braking device embodying my invention applied to only one form of railway signal, it is understood that a device embodying my invention may be equally well applied to any form of electric motor operated signal. And although I have herein shown and described only one form of electric braking device embodying my invention, it is understood that various changes and modifications may be made therein within the scope of the appended claims without departing from the spirit and scope of my invention.

Having thus described my invention, what I claim is:—

1. In combination, an electric motor, and a braking device for the motor comprising a shunt field winding on the motor and a contact controlled by the magnetic flux in the motor field and arranged to control the said shunt field winding.

2. In combination, an electric motor; and a braking device for the motor comprising a shunt field winding on the motor, an auxiliary armature responsive to the presence and absence of magnetic flux in the field of the motor, and a contact operated by the auxiliary armature and arranged to control the shunt field winding.

3. In combination, an electric motor, and a braking device for the motor comprising a shunt field winding on the motor, an auxiliary armature responsive to the presence and absence of magnetic flux in the motor field, and a contact operated by the auxiliary armature and arranged to control the said shunt field.

4. In combination, an electric motor, a source of current for the motor; and a braking device for stopping the movement of the motor when the source of current is cut off from the motor, comprising a shunt field winding on the motor, and a contact controlled by the magnetic flux in the motor field and arranged to control the said shunt field winding.

5. In combination, an electric motor, a source of current for the motor; and a braking device for stopping the movement of the motor when the source of current is cut off from the motor, comprising a shunt field winding for the motor, an auxiliary magnetic circuit for the motor adapted to be energized or deënergized according to whether or not the motor is supplied with current from the said source, an armature controlled by said auxiliary magnetic circuit, and a contact operated by the said armature and adapted to control the said shunt field winding.

6. In combination, an electric motor; and a braking device for the motor comprising a means for causing the motor to act as a generator and means governed by the magnetic flux in the motor field for controlling said means.

7. In combination, an electric motor; and a braking device for stopping the movement of the motor comprising an auxiliary circuit adapted when closed to cause the motor to act as a generator, and a contact controlled by the magnetic flux in the motor field and arranged to control the said auxiliary circuit.

8. In combination, an electric motor, a source of current for the motor, an auxiliary circuit for said motor adapted to cause the motor to act as a generator, and means controlled by the presence and absence in said motor of current from the said source for controlling the auxiliary circuit.

9. In combination, an electric motor, and a braking device for the motor comprising an auxiliary circuit adapted when closed to cause the motor to act as a generator, and means responsive to the magnetic flux in the motor field for controlling the auxiliary circuit.

In testimony whereof I affix my signature in presence of two witnesses.

LAURENCE A. HAWKINS.

Witnesses:
BENJAMIN B. HULL,
HELEN ORFORD.